United States Patent
Vijendra et al.

(10) Patent No.: US 7,930,161 B1
(45) Date of Patent: *Apr. 19, 2011

(54) METHOD AND APPARATUS FOR HORIZONTAL AND VERTICAL MODELED REPRESENTATION AND ANALYSIS OF DISTRIBUTED SYSTEMS

(75) Inventors: Sudhir Vijendra, White Plains, NY (US); Patricia Florissi, Briarcliff Manor, NY (US)

(73) Assignee: EMC Corporation, Hopkinton, MA (US)

( * ) Notice: Subject to any disclaimer, the term of this patent is extended or adjusted under 35 U.S.C. 154(b) by 916 days.

This patent is subject to a terminal disclaimer.

(21) Appl. No.: 11/726,326

(22) Filed: Mar. 21, 2007

(51) Int. Cl.
*G06F 17/50* (2006.01)
*G06F 15/173* (2006.01)
(52) U.S. Cl. .......................... 703/13; 709/223
(58) Field of Classification Search .................... 703/13; 370/397–399; 709/223
See application file for complete search history.

(56) References Cited

U.S. PATENT DOCUMENTS 5,903,568 A * 5/1999 Tanaka et al. ................. 370/469
5,938,733 A * 8/1999 Heimsoth et al. ............. 709/230
2005/0071130 A1* 3/2005 Benjamin et al. ............. 702/188
* cited by examiner

*Primary Examiner* — Jason Proctor
*Assistant Examiner* — Eunhee Kim
(74) *Attorney, Agent, or Firm* — Krishnendu Gupta; Joseph D'Angelo

(57) ABSTRACT

A method, apparatus and computer-program product for modeling distributed systems is disclosed. The method comprises the steps of representing selected ones of a plurality of physical and logical elements as a plurality of objects, organizing the selected ones of the objects within each of the plurality of model layers, the model layers representing at least one function of the distributed network, determining behavioral relationships among objects within each of the model layers and determining behavioral relationships among selected ones of the objects among each of the model layers, said selected objects representing layer endpoints, wherein information between model layers is passed through said layer endpoints. The apparatus recites a processor for performing the steps of the disclosed method and the computer-program product provides code or instruction to a processor for executing the disclosed method steps.

20 Claims, 8 Drawing Sheets

FIG. 3A

GenericConnection Class

```
abstract interface GenericConnection : Session
{
   attribute boolean Disconnected
   =FALSE;

propagate symptom GenericConnectionDisconnect
   =GenericConnection, Underlying, Disconnect;

propagate symptom GenericEndpointDisconnect
   =GenericProtocolEndpoint, LayeredOver, Disconnect;

| problem Down
   =Disconnect,
    ProtocolEndpointDisconnect,
    GenericConnectionDisconnect;
   export Down;

propagate aggregate GenericConnectionImpacted
   =GenericConnection, LayeredOver, Impacted;

propagate aggregate GenericProtocolEndpointImpacted
   =GenericProtocolEndpoint, LayeredOver, Impacted;

| aggregate Impacted
   =Down,
    GenericProtocolEndpointImpacted,
    GenericConnectionImpacted;
   export Impacted;

event Disconnect
   =(Disconnected==TRUE);
   export Disconnect;
};
```

FIG. 3B

GenericProtocolEndpoint Class

```
abstract interface GenericProtocolEndpoint : ProtocolEndpoint
{
   attribute boolean Disconnected
   =FALSE;

propagate symptom ProtocolEndpointDisconnect
   =GenericProtocolEndpoint, Underlying, Disconnect;

problem Down
   =Disconnect,
    ProtocolEndpointDisconnect,
   export Down;

propagate aggregate GenericProtocolEndpointImpacted
   =GenericProtocolEndpoint, LayeredOver, Impacted;

propagate aggregate GenericConnectionImpacted
   =GenericConnection, Underlying, Impacted;

aggregate Impacted
   =Down,
   GenericConnectionImpacted,
   GenericProtocolEndpointImpacted;
   export Impacted;

event Disconnect
   =(Disconnected==TRUE);
   export Disconnect;
};
```

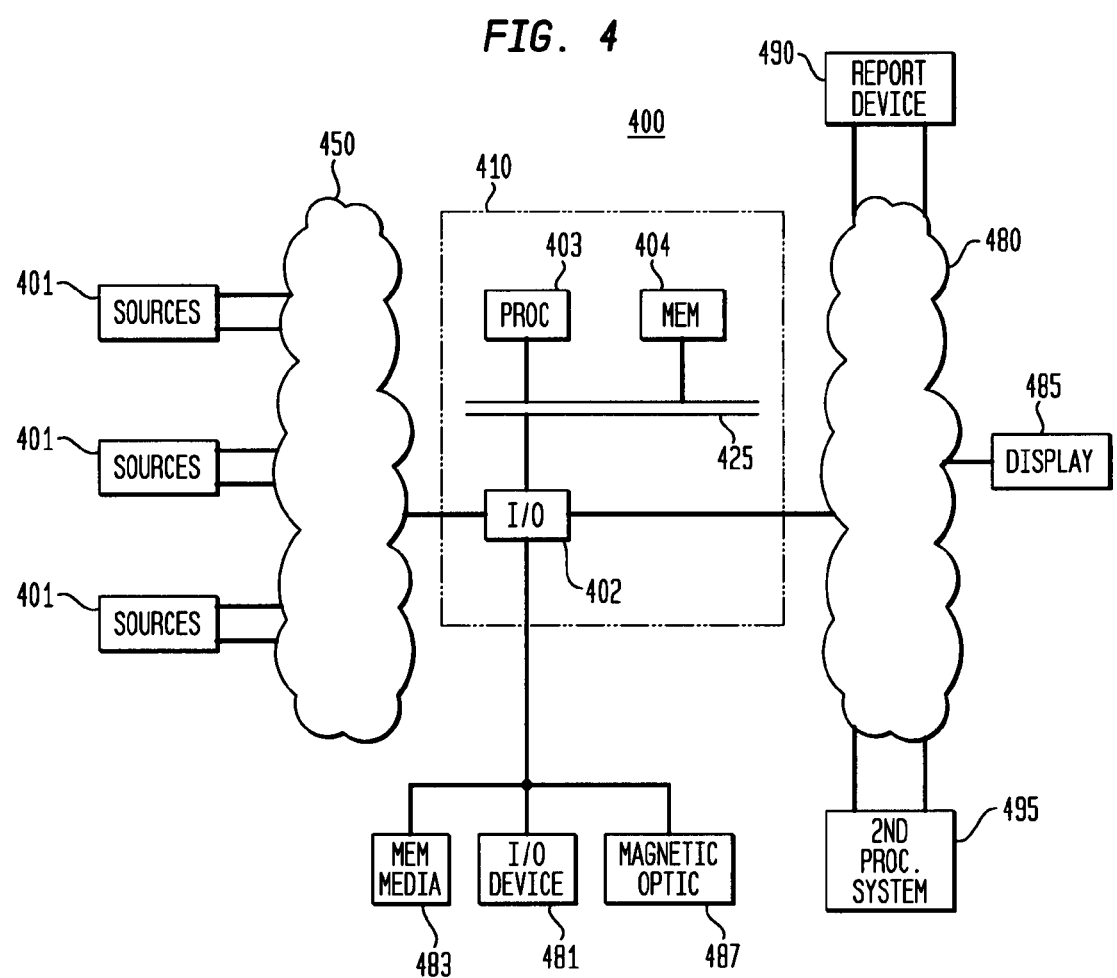

METHOD AND APPARATUS FOR HORIZONTAL AND VERTICAL MODELED REPRESENTATION AND ANALYSIS OF DISTRIBUTED SYSTEMS

RELATED APPLICATIONS

This application is related to commonly-owned, co-pending patent application entitled "Method and Apparatus for Representing, and Analyzing Virtual Private Networks", filed in the US Patent and Trademark Office on Mar. 29, 2007 and afforded Ser. No. 11/731,696, the contents of which are incorporated by reference herein.

COPYRIGHT NOTICE

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to distributed systems, and more particular to methods and apparatus for providing horizontal and vertical analysis for distributed systems.

BACKGROUND OF THE INVENTION

Modeling has proven to be an asset in determining or predicting the characteristics of distributed systems, such as local area networks (LANs), wide area networks (WANs) and Global networks (internal and external) in response to one or more stimuli. Generally, the model incorporates the attributes and parameters of network elements and, in some cases, the relationships among the network elements. For example, commonly-owned U.S. Pat. Nos. 5,528,516; 5,661,668; 6,249,755; 6,868,367; 7,003,433, 7,337,090, and 7,107,185, the contents of which are incorporated by reference herein, describe methods and systems of network modeling utilizing network attributes, parameters and their relationships. The aforementioned patents and patent applications further describe methods for performing system analysis based on a mapping of observable events and detectable events, e.g., symptoms and problems, respectively, in IP-based networks.

However, the present methods of modeling networks are typically designed for a particular network type or network protocol. For example, U.S. application Ser. No. 11/176,982, entitled "Method and Apparatus for Analyzing and Problem Reporting in Storage Area Networks," filed on Jul. 8, 2005, describes methods of modeling storage area networks and performing a system analysis on the modeled network, U.S. application Ser. No. 11/325,108, entitled "Method and Apparatus for Analyzing and Problem Reporting in RFID Networks," filed on Jan. 6, 2006, describes methods of modeling RFID networks and performing a system analysis on the modeled network and U.S. application Ser. No. 10/949,415, entitled "Method and Apparatus for Modeling and Analyzing of MPLS and Virtual Private Networks," filed on Sep. 24, 2006, describes methods of modeling MPLS and Virtual Private Network (VPN) and performing a system analysis on the modeled network. In addition, U.S. patent application Ser. No. 11/211,234, entitled "Method and Apparatus for Configuration and Analysis of Network Routing Protocols," filed on Aug. 25, 2005, describes methods for modeling and analyzing network routing protocols. The aforementioned patent applications are commonly-owned by the assignee of the instant invention and there contents are incorporated by reference herein.

With current modeling technology, however, the constructed models are designed specifically for the network or protocol being modeled. These specifically constructed models however limit the ability of the model to be used in different applications and further requires additional efforts to update and maintain the models as new features are added that may be common to all the models or specific to one individual mode.

Hence, there is a need in the industry for a method and apparatus for a general model scheme to allow adaptation of the model in view of the changing network components, protocols and/or configurations.

SUMMARY OF THE INVENTION

A method, apparatus and computer-program product for modeling distributed systems is disclosed. The method comprises the steps of representing selected ones of a plurality of physical and logical elements as a plurality of objects, organizing the selected ones of the objects within each of the plurality of model layers, the model layers representing at least one function of the distributed network, determining behavioral relationships among objects within each of the model layers and determining behavioral relationships among selected ones of the objects among each of the model layers, said selected objects representing layer endpoints, wherein information between model layers is passed through said layer endpoints. The apparatus recites a processor for performing the steps of the disclosed method and the computer-program product provides code or instruction to a processor for executing the disclosed method steps.

DETAILED DESCRIPTION OF THE FIGURES

FIGS. 1A-1E collectively illustrate a conceptual construction of models in accordance with the principles of the invention;

FIGS. 3A and 3B illustrate exemplary software instruction for implementing the processing shown in FIGS. 2A-2C; and FIG. 4 illustrates a system implementing the processing shown herein.

Figure 1A:
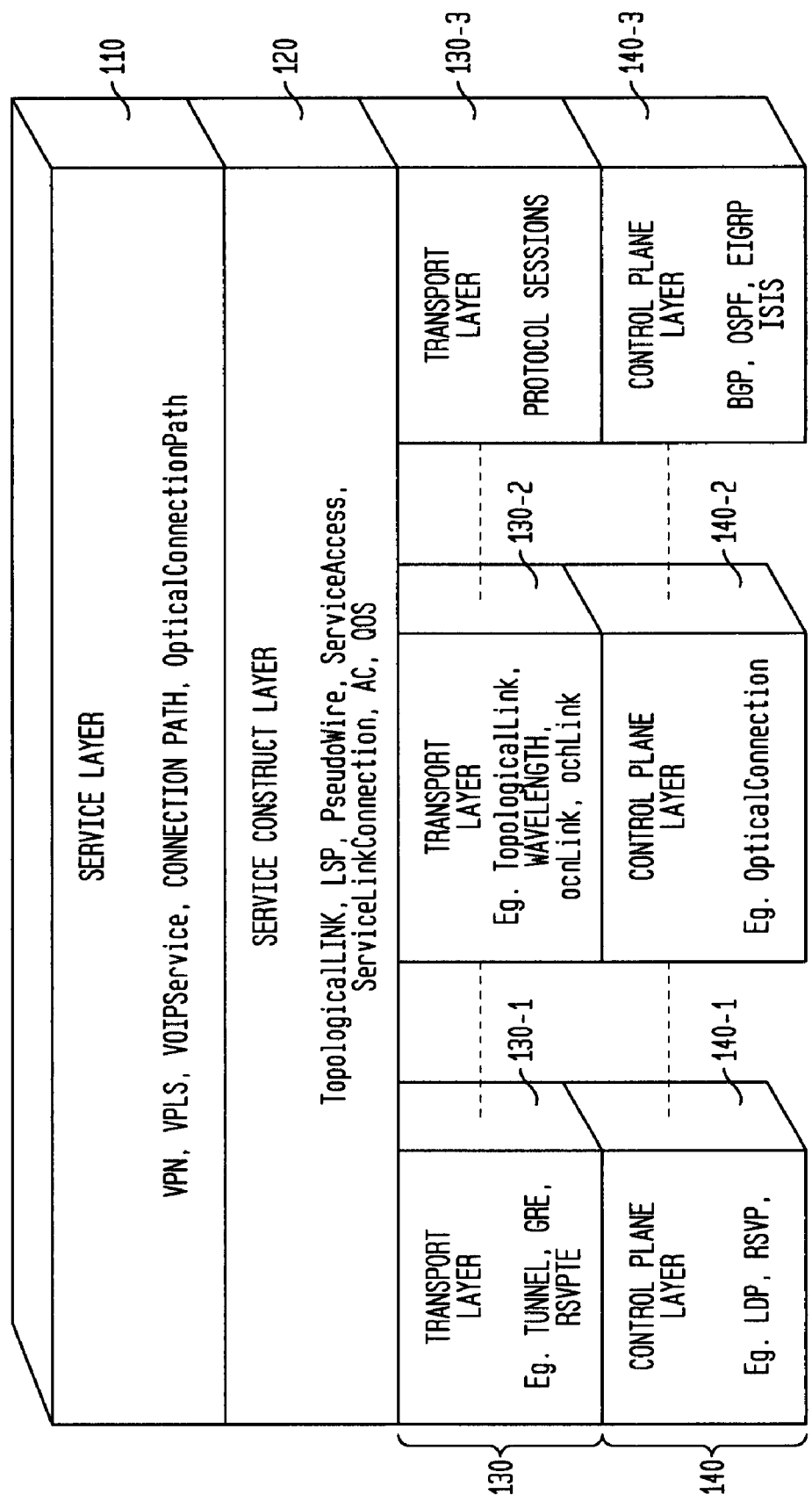

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

FIG. 1A illustrates a block diagram of an exemplary conceptual model of a distributed system in accordance with the principles of the invention. In this illustrative block diagram, the functionality of the elements of the distributed system are separated into layers; Service Layer 110, Service Construct Layer 120, Transport Layer 130 and Control Plane Layer 140. The Service Layer 110 represents the service functions that are to be performed over the distributed system. For example, the service may be a VoIP (Voice over IP) service. This service may be achieved by using a Variable Protocol Label Switch (VPLS) protocol over an optical connection. The Service Construct Layer 120 represents the factors associated with the service, e.g., Quality of Service (QoS). The Transport Layer 130 represents the logical elements used to construct the service. The Transport Layer may consider elements such as the tunnel configuration 130-1, or the wavelengths used in the optical connection 130-2 and the protocol sessions that are established 130-3. The Control Plane Layer associates the physical elements of the network with the corresponding logical element in the Transport Layer 130.

The model concept presented herein provides for the maintenance of a higher level service function without the need of having knowledge of the underlying elements. That is, the exemplary VoIP service shown in Service Layer 110 may be performed whether the underlying transmission medium layer is an optical, a wireless or an electrical communication link.

Figure 1B:
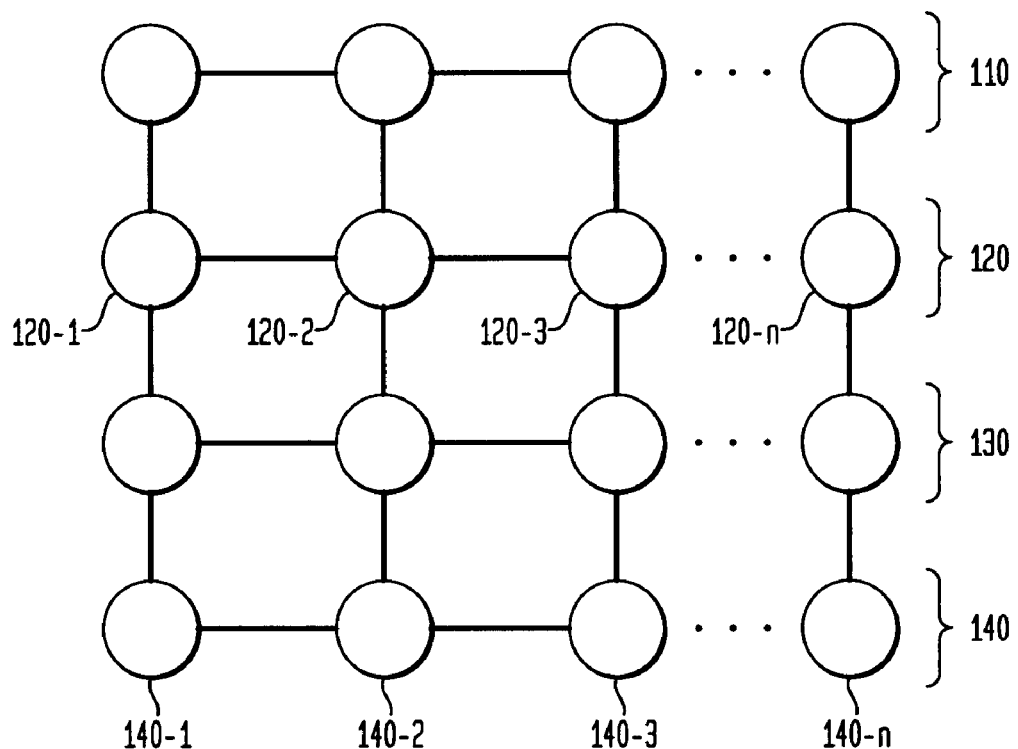

FIG. 1B illustrates the interconnection among a plurality of objects, protocols, logical and physical elements, applications, and/or services in accordance with the principles of the invention. For example, layer 140 (Control Plane Layer) is composed of a plurality of physical elements, (e.g., protocols, optical connections, etc.) 140-1 ... 140-n that are interconnected or interrelated. Each of the objects or elements possesses a behavioral relationship with adjacent objects or elements. Similarly, Transport layer 130 is composed of a plurality of logical elements 130-1 ... 130-n that are interconnected or interrelated. Similar relationships, are illustrated for the Service Construct layer 120 and Service layer 110.

Figure 1C:
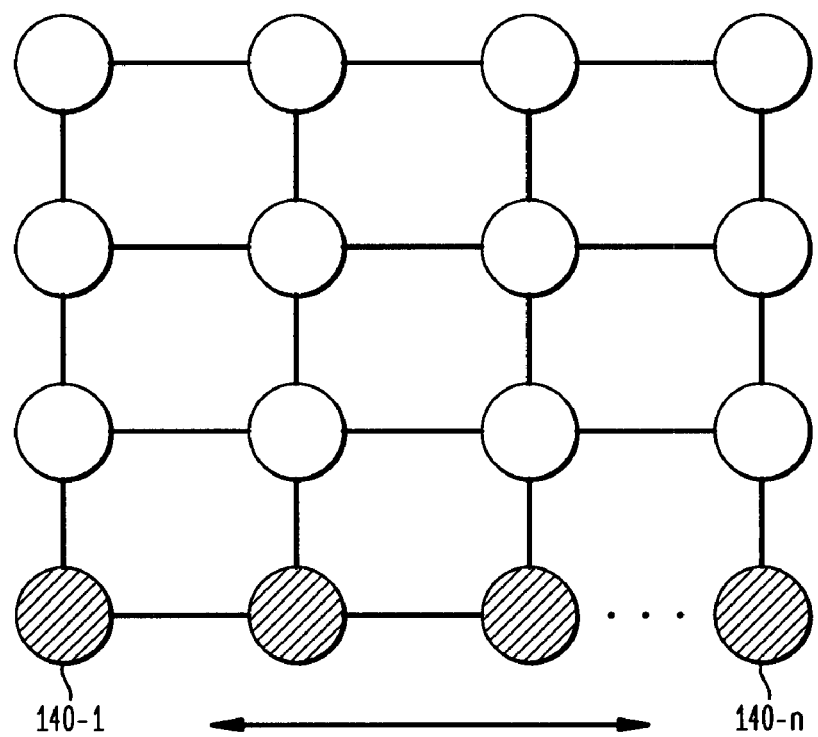
Figure 1D:
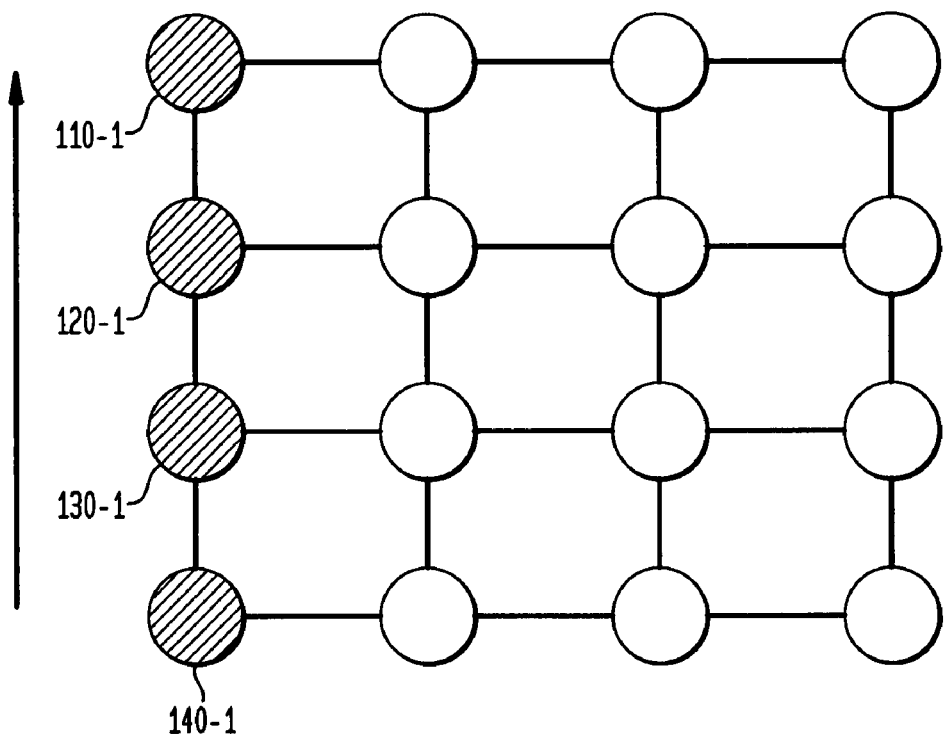
Figure 1E:
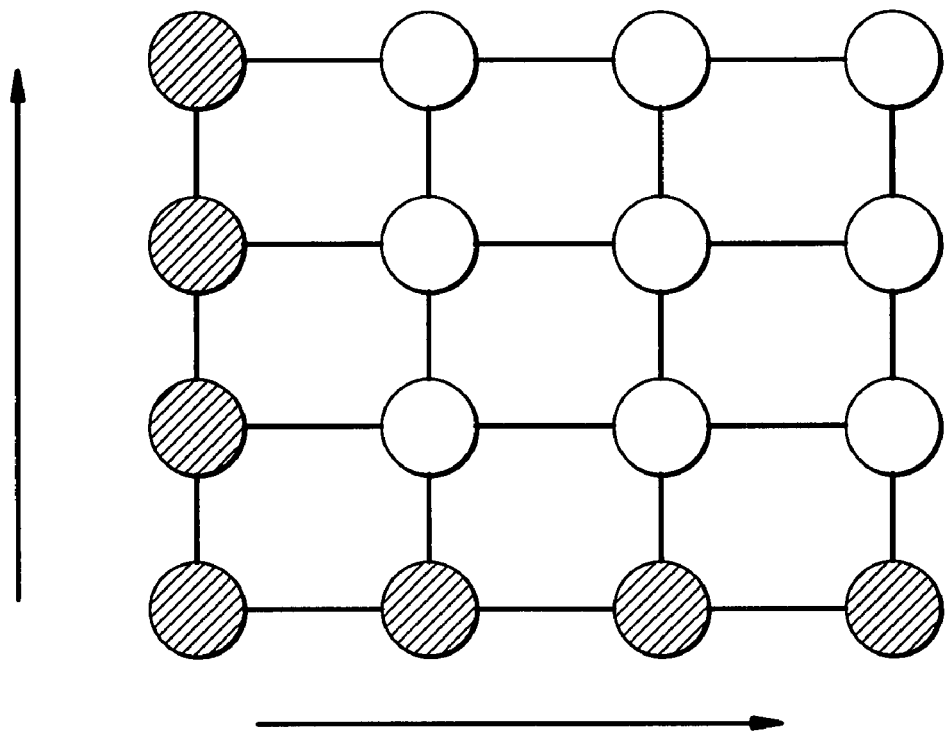

FIG. 1C illustrates the horizontal or intra-layer propagation of an error occurring in element 140-1 through elements 140-2 ... 140-n. FIG. 1D illustrates the vertical or interlayer propagation of an error occurring in element 140-1 through elements 130-1, 120-1 and 110-1. FIG. 1E illustrates the propagation of an error in element 140-1 propagating both horizontally and vertically.

Figure 2A:
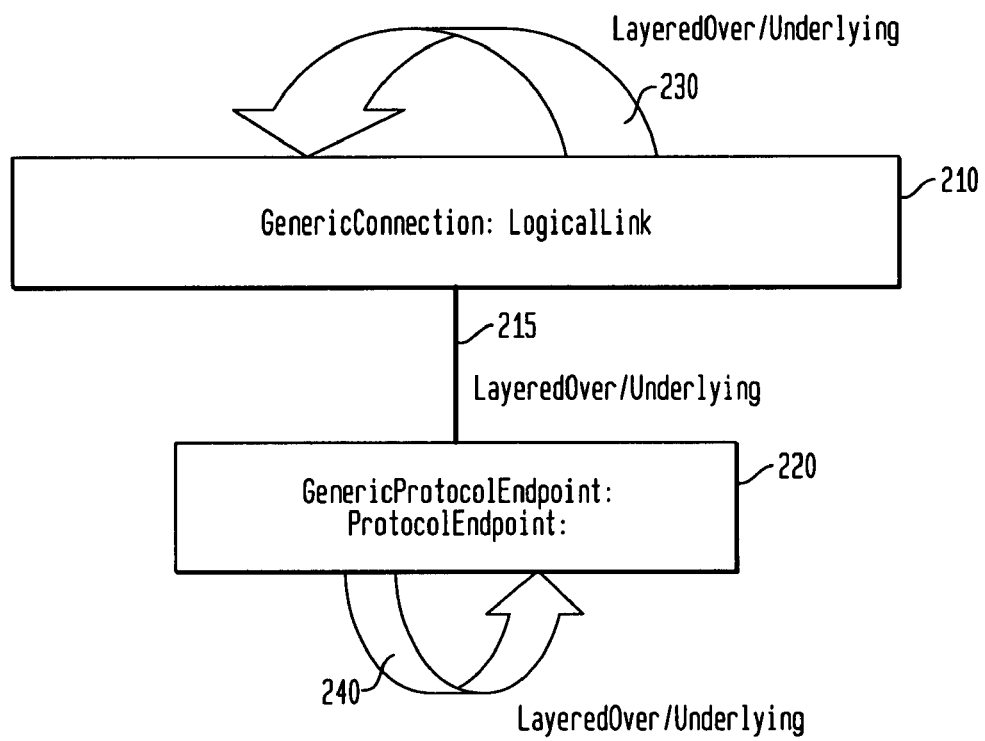
FIG. 2A illustrates a block diagram of a conceptual model in accordance with the principles of the invention.

FIG. 2A illustrates a block diagram of an exemplary object diagram in accordance with the principles of the invention. In this illustrative construction, the GenericConnection 210 and GenericProtocolEndpoint 220 objects are related by a LayeredOver relationship 215. The GenericProtocolEndpoint object 220 represents that logical or physical entity where information regarding a managed service is available. The GenericConnection object 210 represents the logical or physical entity for transporting the information associated with the service.

In addition, each object possesses a recursive Layeredover/ Underlying relationship 230 and 240. Thus, the processing associated within each object is recursive and further illustrates that the processing associated with a distributed system is essentially the same at each of the model levels shown in FIG. 2A, whether performing processing between respective layers, i.e., vertical integration, through relationship 240 or within a layer, i.e., horizontal integration, through relationship 230.

Referring back to FIG. 1B, each of the objects 110-1-110-n, 120-1-120-n, 130-1-130-n, 140-1-140-n, are represented by the GenericProtocolEndpoint (GPE) object 220 and the connection lines therebetween are represented by Generic Connection object (GC) 210. Now referring to FIG. 1C, errors that occur in object 140-1 can propagate horizontally (or intra-layer) to each of the objects 140-2 through 140-n, by recursive application of the relationships between specific objects. Similarly, the errors occurring in object 140-1 can propagate vertically (or inter-layer) to each of the objects 130-1, 120-1 and 110-1, (FIG. 1D) by recursive application of the relationships between specific objects.

Figure 2B:
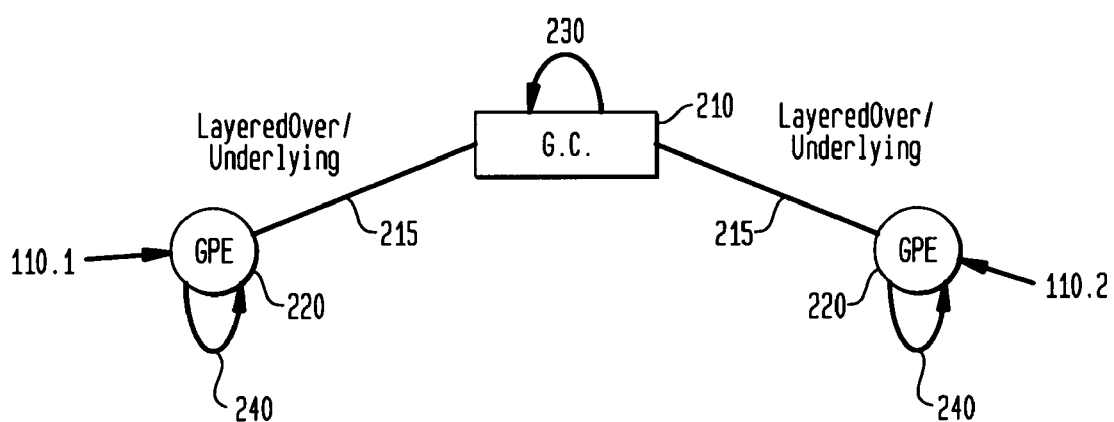
FIG. 2B illustrates an instance diagram representing logical relationship among elements in the model in accordance with the principles of the invention.

FIG. 2B represents an instance diagram illustrating the relationship between two exemplary protocol endpoints 220 representing objects 110-1 and 110-2 through generic connection object 210. As an example, the protocol endpoints may represent logical or physical ports on a host or switch and GC 210 may present a logical or physical path between the ports. Also illustrated are the recursive relationships 240 of the protocol endpoints 220 and the recursive relationship 230 of the generic connection 210.

Figure 2C:
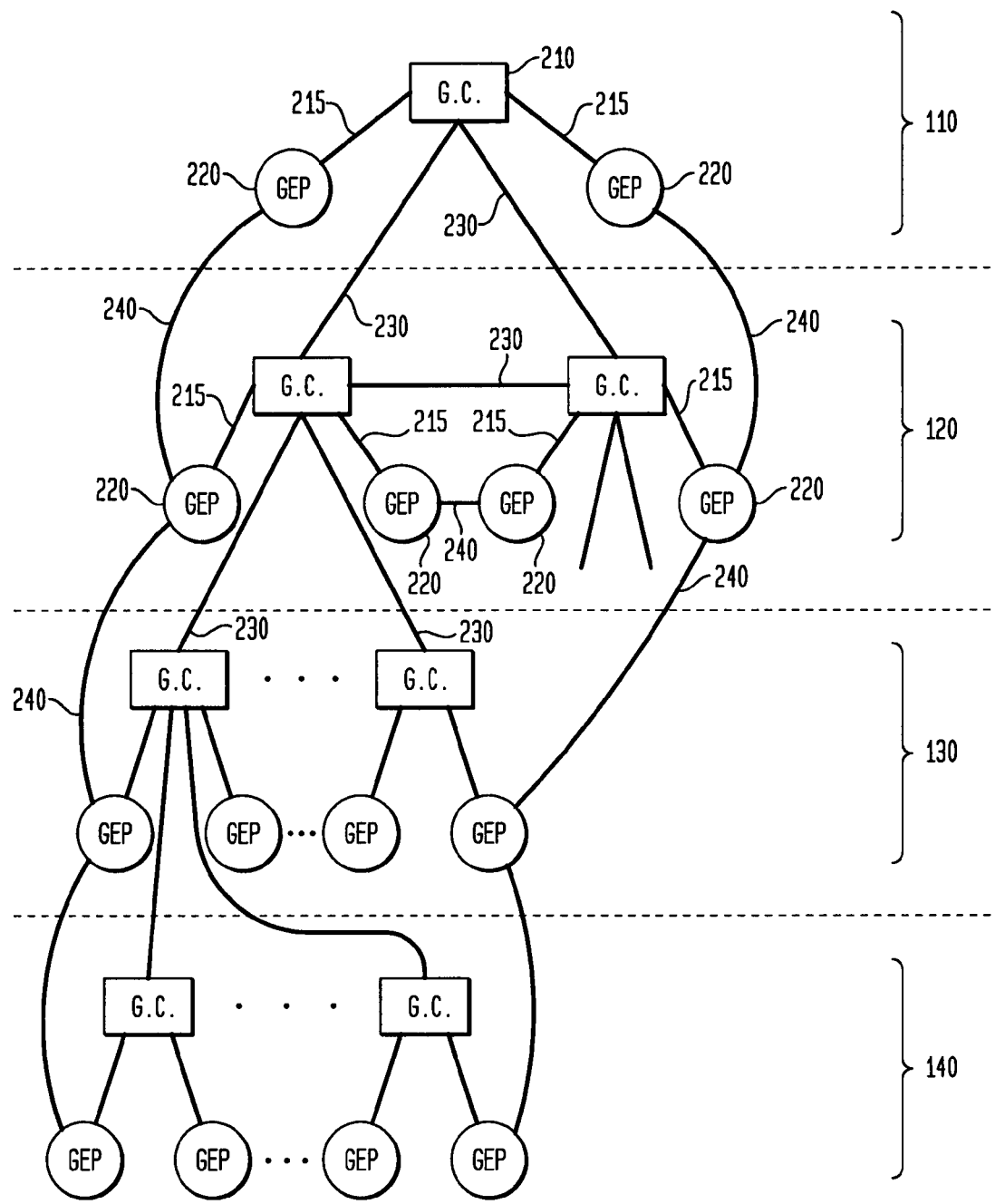
FIG. 2C illustrates an exemplary instance diagram representing logical relationship of elements within the model layers shown in FIG. 2A.

FIG. 2C represents an instance diagram illustrating the relationships among exemplary protocol endpoint, both horizontally and vertically, associated with objects in the model layers shown in FIG. 2A. In this illustrated example, GPE objects 210 at the service layer 110 are vertically associated with similar GPE objects 210 at the connection layer 120. Similarly, the single illustrated GC object 210 at the service layer 110 is vertically associated with, the plurality of GC objects at the connection layer 120. Also, illustrated are the horizontal association 230 between the CG 210 and the horizontal association 240 between the GEP objects 220 at the service connection layer 120. Similar vertical and horizontal associations between GC objects 220 and GEP objects 210 at the transport layer 130 and control player layer 140 are illustrated. Although vertical associations only between end points of the GEP objects 220 are illustrated, it would be recognized that vertical associations among intermediate CEP objects 220 from one layer to another may also be considered and contemplated to be within the scope of the invention.

FIGS. 3A and 3B represent exemplary processing for the GenericConnection object 210 and the GenericProtocolEndpoint object 220, respectively shown in FIG. 2A. FIG. 3A illustrates an exemplary computer-code implementation associated with the recursive processing of the GenericConnection 210 object shown in FIG. 2A. In this illustrative example, when a problem is detected, the connection and the associated endpoint are disconnected from the object detecting the problem and the connection is declared "Down." Further when the connection is declared "Down" the associated GenericProtocolEndpoint and Generic Connection (i.e., horizontal and vertical associations, respectively) are declared impacted. FIG. 3B illustrates an exemplary computer-code implementation associated with the recursive processing of the GenericProtocolEndpoint 220 object shown in FIG. 2A. In this case, when a problem in an endpoint object is detected, the endpoint is disconnected and the endpoint declared "Down." Further, upon determination of the endpoint being declared "Down" the associated GenericProtocolEndpoint and Generic Connection (i.e., horizontal and vertical associations, respectively) are declared impacted.

Accordingly, application of the exemplary computer-code in FIGS. 3A and 3B to a model representation of a distributed system, e.g., computer-network, public or private networks, etc., or aspects of such distributed systems, e.g., protocols used, provides a simple and consistent process for propagating events, such as problems, from one modeled layer of the distributed system to a higher layer.

FIG. 4 illustrates an exemplary embodiment of a system 400 that may be used for implementing the principles of the present invention. System 400 may contain one or more input/output devices 402, processors 403 and memories 404. I/O devices 402 may access or receive information from one or more sources or devices 401. Sources or devices 401 may be devices such as routers, servers, computers, notebook computer, PDAs, cell phones or other devices suitable for transmitting and receiving information responsive to the processes shown herein. Devices 401 may have access over one or more network connections 450 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 402, processors 403 and memories 404 may communicate over a communication medium 425. Communication medium 425 may represent, for example, a bus, a communication network, one or more internal connections of a circuit, circuit card or other apparatus, as well as portions and combinations of these and other communication media. Input data from the sources or client devices 401 is processed in accordance with one or more programs that may be stored in memories 404 and executed by processors 403. Memories 404 may be any magnetic, optical or semiconductor medium that is loadable and retains information either permanently, e.g. PROM, or non-permanently, e.g., RAM. Processors 403 may be any means, such as general purpose or special purpose computing system, such as a laptop computer, desktop computer, a server, handheld computer, or may be a hardware configuration, such as dedicated logic circuit, or integrated circuit. Processors 403 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 404. The code may be read or downloaded from a memory medium 483, an I/O device 481 or magnetic or optical media, such as a floppy disk, a CD-ROM or a DVD, 487 and then stored in memory 404. In another aspect, the code may be downloaded, for example, over one or more of the illustrated networks. As would be appreciated, the code may be processor-dependent or processor-independent. JAVA is an example of processor-independent code. JAVA is a trademark of the Sun Microsystems, Inc., Santa Clara, Calif. USA.

Information from device 401 received by I/O device 402, after processing in accordance with one or more software programs operable to perform the functions illustrated herein, may also be transmitted over network 480 to one or more output devices represented as display 485, reporting device 490 or second processing system 495.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It would be recognized that the invention is not limited by the model discussed, and used as an example, or the specific proposed modeling approach described herein. For example, it would be recognized that the method described herein may be used to perform a system analysis may include: fault detection, fault monitoring, performance, congestion, connectivity, interface failure, node failure, link failure, routing protocol error, routing control errors, and root-cause analysis.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A computer implemented method for modeling a distributed system composed of a plurality of physical and logical elements, the method comprising the steps of:
representing for a model selected ones of the plurality of physical and logical elements of the distributed system as a plurality of generic objects;
organizing selected ones of the generic objects within each of a plurality of model layers, the model layers representing at least one function of the distributed system;
determining behavioral relationships among generic objects within each of the model layers; and
determining behavioral relationships among selected ones of the generic objects among each of the model layers, said selected generic objects representing layer endpoints, wherein information between model layers is passed through said layer endpoints;
wherein the generic objects help provide for maintenance of a higher level service function without need of having knowledge of the physical and logical elements of the distributed system and enables performance regardless of any transmission medium layer of the distributed system and further enabling adaption of the model for changing network components, protocols and configurations.

2. The method as recited in claim 1, wherein a group of layers from which said model layers is selected is composed of: Service, Service connection, Transport and Protocol.

3. The method as recited in claim 1, further comprising the steps of:
providing a mapping between a plurality of observable events and a plurality of causing events occurring in the modeled generic objects within each layer;
determining at least one likely causing event based on at least one of the plurality of observable events within each layer; and providing said at least one likely causing event to be propagated to a next layer through said end points.

4. The method as recited in claim 3, wherein said step of determining likely causing event, comprises the step of;
determining a measure between each of a plurality of values associated with the plurality of observable events and the plurality of causing events at least one model layer.

5. The method as recited in claim 1, wherein said behavioral relationship is Layeredover/underlying.

6. The method as recited in claim 5, wherein said behavioral relationship is recursive.

7. The method of claim 1 wherein at least one of the generic objects is selected from the group comprising GenericProtocolEndpoint and GenericConnection.

8. An apparatus for modeling a distributed system composed of a plurality of physical and logical elements, the apparatus comprising:
a processor in communication with a memory, the processor accessing code in said memory and causing the processor to execute the steps of:
representing for a model selected ones of the plurality of physical and logical elements of the distributed system as a plurality of generic objects;
organizing selected ones of the generic objects within each of a plurality of model layers, the model layers representing at least one function of the distributed system;
determining behavioral relationships among generic objects within each of the model layers; and
determining behavioral relationships among selected ones of the generic objects among each of the model layers, said selected generic objects representing layer endpoints, wherein information between model layers is passed through said layer endpoints;
wherein the generic objects help provide for maintenance of a higher level service function without need of having knowledge of the physical and logical elements of the distributed system and enables performance regardless of any transmission medium layer of the distributed system and further enabling adaption of the model for changing network components, protocols and configurations.

9. The apparatus as recited in claim 8, wherein a group of layers from which said model layers is selected is composed of: Service, Service connection, Transport and Protocol.

10. The apparatus as recited in claim 8, wherein the processor further accessing code to execute the steps of:
providing a mapping between a plurality of observable events and a plurality of causing events occurring in the modeled generic objects within each layer;
determining at least one likely causing event based on at least one of the plurality of observable events within each layer; and
providing said at least one likely causing event to be propagated to a next layer through said end points.

11. The apparatus as recited in claim 10, wherein said step of determining likely causing events, comprises the step of:
determining a measure between each of a plurality of values associated with the plurality of observable events and the plurality of causing events at least one model layer.

12. The apparatus as recited in claim 8, wherein said behavioral relationship is Layeredover/underlying.

13. The apparatus as recited in claim 12, wherein said behavioral relationship is recursive.

14. A computer-program product embodied in non-transitory computer readable medium providing instruction to a processor for modeling a distributed system composed of a plurality of physical and logical elements, the instruction causing the processor to execute the steps of:
representing for a model selected ones of the plurality of physical and logical elements of the distributed system as a plurality of generic objects;
organizing selected ones of the generic objects within each of a plurality of model layers, the model layers representing at least one function of the distributed system;
determining behavioral relationships among generic objects within each of the model layers; and
determining behavioral relationships among selected ones of the generic objects among each of the model layers, said selected generic objects representing layer endpoints, wherein information between model layers is passed through said layer endpoints;
wherein the generic objects help provide for maintenance of a higher level service function without need of having knowledge of the physical and logical elements of the distributed system and enables performance regardless of any transmission medium layer of the distributed system and further enabling adaption of the model for changing network components, protocols and configurations.

15. The computer-program product as recited in claim 14, wherein a group of layers from which said model layers is selected is composed of: Service, Service connection, Transport and Protocol.

16. The computer-program product as recited in claim 14, wherein the instruction causing the processor to further execute the steps of:
providing a mapping between a plurality of observable events and a plurality of causing events occurring in the modeled generic objects within each layer;
determining at least one likely causing event based on at least one of the plurality of observable events within each layer; and
providing said at least one likely causing event to be propagated to a next layer through said end points.

17. The computer-program product as recited in claim 16, wherein said step of determining likely causing events, comprises the step of:
determining a measure between each of a plurality of values associated with the plurality of observable events and the plurality of causing events at least one model layer.

18. The computer-program product as recited in claim 14, wherein said behavioral relationship is Layeredover/underlying.

19. The computer-program product as recited in claim 18, wherein said behavioral relationship is recursive.

20. The computer product of claim 14 wherein at least one of the generic objects is selected from the group comprising GenericProtocolEndpoint and GenericConnection.

* * * * *